(12) United States Patent
Jalan et al.

(10) Patent No.: US 9,906,422 B2
(45) Date of Patent: Feb. 27, 2018

(54) DISTRIBUTED SYSTEM TO DETERMINE A SERVER'S HEALTH

(71) Applicant: A10 Networks, Inc., San Jose, CA (US)

(72) Inventors: Rajkumar Jalan, Saratoga, CA (US); Swaminathan Sankar, San Jose, CA (US); Gurudeep Kamat, San Jose, CA (US)

(73) Assignee: A10 NETWORKS, INC., San Jose, CA (US)

( * ) Notice: Subject to any disclaimer, the term of this patent is extended or adjusted under 35 U.S.C. 154(b) by 521 days.

(21) Appl. No.: 14/280,481

(22) Filed: May 16, 2014

(65) Prior Publication Data

US 2015/0333988 A1    Nov. 19, 2015

(51) Int. Cl.
*H04L 12/26*    (2006.01)
(52) U.S. Cl.
CPC .......... *H04L 43/0817* (2013.01); *H04L 43/04* (2013.01)
(58) Field of Classification Search
CPC ....................................................... H04L 43/08
USPC ........................................................ 709/224
See application file for complete search history.

(56) References Cited

U.S. PATENT DOCUMENTS

| | | |
|---|---|---|
| 4,001,819 A | 1/1977 | Wise |
| 5,101,402 A | 3/1992 | Chiu et al. |
| 5,163,088 A | 11/1992 | LoCascio |
| 5,218,602 A | 6/1993 | Grant et al. |
| 5,359,659 A | 10/1994 | Rosenthal |
| 5,414,833 A | 5/1995 | Hershey et al. |
| 5,684,875 A | 11/1997 | Ellenberger |
| 5,774,660 A | 6/1998 | Brendel et al. |
| 5,935,207 A | 8/1999 | Logue et al. |
| 5,940,002 A | 8/1999 | Finn et al. |
| 5,958,053 A | 9/1999 | Denker |

(Continued)

FOREIGN PATENT DOCUMENTS

| | | |
|---|---|---|
| CN | 1372662 A | 10/2002 |
| CN | 1422468 A | 6/2003 |

(Continued)

OTHER PUBLICATIONS

Koike et al., "Transport Middleware for Network-Based Control," IEICE Technical Report, Jun. 22, 2000, vol. 100, No. 53, pp. 13-18.

(Continued)

*Primary Examiner* — Vivek Srivastava
*Assistant Examiner* — Sibte Bukhari
(74) *Attorney, Agent, or Firm* — AMPACC Law Group, LLP; Keith Kline

(57) ABSTRACT

Exemplary embodiments for a distributed system for determining a server's health are disclosed. The systems and methods provide for a network controller to direct one or more servicing nodes to check the health of one or more servers, and report a health score to the network controller. The network controller may then calculate, update and maintain a health score for each server in the network from the various health scores reported to it from the servicing nodes. This allows a distributed system to be used to facilitate network operations, as a single device is not relied on for periodically determining each server's health.

18 Claims, 6 Drawing Sheets

(56) References Cited

U.S. PATENT DOCUMENTS

| | | |
|---|---|---|
| 5,960,177 A | 9/1999 | Tanno |
| 5,995,981 A | 11/1999 | Wikstrom |
| 6,003,069 A | 12/1999 | Cavill |
| 6,047,268 A | 4/2000 | Bartoli et al. |
| 6,088,804 A | 7/2000 | Hill et al. |
| 6,119,236 A | 9/2000 | Shipley |
| 6,131,163 A | 10/2000 | Wiegel |
| 6,205,115 B1 | 3/2001 | Ikebe et al. |
| 6,219,706 B1 | 4/2001 | Fan et al. |
| 6,237,036 B1 | 5/2001 | Ueno et al. |
| 6,259,705 B1 | 7/2001 | Takahashi et al. |
| 6,304,975 B1 | 10/2001 | Shipley |
| 6,321,338 B1 | 11/2001 | Porras et al. |
| 6,324,286 B1 | 11/2001 | Lai et al. |
| 6,374,300 B2 | 4/2002 | Masters |
| 6,449,651 B1 | 9/2002 | Dorfman et al. |
| 6,459,682 B1 | 10/2002 | Ellesson et al. |
| 6,519,703 B1 | 2/2003 | Joyce |
| 6,587,866 B1 | 7/2003 | Modi et al. |
| 6,594,780 B1 | 7/2003 | Shen et al. |
| 6,715,081 B1 | 3/2004 | Attwood et al. |
| 6,732,279 B2 | 5/2004 | Hoffman |
| 6,735,702 B1 | 5/2004 | Yavatkar et al. |
| 6,748,414 B1 | 6/2004 | Bournas |
| 6,754,832 B1 | 6/2004 | Godwin et al. |
| 6,757,822 B1 | 6/2004 | Feiertag et al. |
| 6,772,334 B1 | 8/2004 | Glawitsch |
| 6,779,017 B1 | 8/2004 | Lamberton et al. |
| 6,779,033 B1 | 8/2004 | Watson et al. |
| 6,779,117 B1 | 8/2004 | Wells |
| 6,952,728 B1 | 10/2005 | Alles et al. |
| 6,988,106 B2 | 1/2006 | Enderwick et al. |
| 7,010,605 B1 | 3/2006 | Dharmarajan |
| 7,013,482 B1 | 3/2006 | Krumel |
| 7,058,718 B2 | 6/2006 | Fontes et al. |
| 7,069,438 B2 | 6/2006 | Balabine et al. |
| 7,076,555 B1 | 7/2006 | Orman et al. |
| 7,143,087 B2 | 11/2006 | Fairweather |
| 7,159,237 B2 | 1/2007 | Schneier et al. |
| 7,167,927 B2 | 1/2007 | Philbrick et al. |
| 7,181,524 B1 | 2/2007 | Lele |
| 7,194,766 B2 | 3/2007 | Noehring et al. |
| 7,218,722 B1 | 5/2007 | Turner et al. |
| 7,222,366 B2 | 5/2007 | Bruton, III et al. |
| 7,228,359 B1 | 6/2007 | Monteiro |
| 7,234,161 B1 | 6/2007 | Maufer et al. |
| 7,236,457 B2 | 6/2007 | Joe |
| 7,254,133 B2 | 8/2007 | Govindarajan et al. |
| 7,269,850 B2 | 9/2007 | Govindarajan et al. |
| 7,277,963 B2 | 10/2007 | Dolson et al. |
| 7,296,283 B2 | 11/2007 | Hrastar et al. |
| 7,301,899 B2 | 11/2007 | Goldstone |
| 7,308,499 B2 | 12/2007 | Chavez |
| 7,310,686 B2 | 12/2007 | Uysal |
| 7,328,267 B1 | 2/2008 | Bashyam et al. |
| 7,334,232 B2 | 2/2008 | Jacobs et al. |
| 7,337,241 B2 | 2/2008 | Boucher et al. |
| 7,343,399 B2 | 3/2008 | Hayball et al. |
| 7,349,970 B2 | 3/2008 | Clement et al. |
| 7,370,353 B2 | 5/2008 | Yang |
| 7,391,725 B2 | 6/2008 | Huitema et al. |
| 7,392,241 B2 | 6/2008 | Lin et al. |
| 7,398,317 B2 | 7/2008 | Chen et al. |
| 7,418,733 B2 | 8/2008 | Connary et al. |
| 7,423,977 B1 | 9/2008 | Joshi |
| 7,430,755 B1 | 9/2008 | Hughes et al. |
| 7,463,648 B1 | 12/2008 | Eppstein et al. |
| 7,467,202 B2 | 12/2008 | Savchuk |
| 7,472,190 B2 | 12/2008 | Robinson |
| 7,492,766 B2 | 2/2009 | Cabeca et al. |
| 7,506,360 B1 | 3/2009 | Wilkinson et al. |
| 7,509,369 B1 | 3/2009 | Tormasov |
| 7,512,980 B2 | 3/2009 | Copeland et al. |
| 7,533,409 B2 | 5/2009 | Keane et al. |
| 7,543,052 B1 | 6/2009 | Cesa Klein |
| 7,552,323 B2 | 6/2009 | Shay |
| 7,565,549 B2 | 7/2009 | Satterlee et al. |
| 7,577,833 B2 | 8/2009 | Lai |
| 7,584,262 B1 | 9/2009 | Wang et al. |
| 7,584,301 B1 | 9/2009 | Joshi |
| 7,590,736 B2 | 9/2009 | Hydrie et al. |
| 7,613,193 B2 | 11/2009 | Swami et al. |
| 7,613,822 B2 | 11/2009 | Joy et al. |
| 7,640,591 B1 | 12/2009 | Tripathi et al. |
| 7,653,633 B2 | 1/2010 | Villella et al. |
| 7,665,138 B2 | 2/2010 | Song et al. |
| 7,673,072 B2 | 3/2010 | Boucher et al. |
| 7,675,854 B2 | 3/2010 | Chen et al. |
| 7,703,102 B1 | 4/2010 | Eppstein et al. |
| 7,707,295 B1 | 4/2010 | Szeto et al. |
| 7,711,790 B1 | 5/2010 | Barrett et al. |
| 7,739,736 B1 | 6/2010 | Tripathi et al. |
| 7,747,748 B2 | 6/2010 | Allen |
| 7,765,328 B2 | 7/2010 | Bryers et al. |
| 7,792,113 B1 | 9/2010 | Foschiano et al. |
| 7,808,994 B1 | 10/2010 | Vinokour et al. |
| 7,809,131 B1 | 10/2010 | Njemanze et al. |
| 7,826,487 B1 | 11/2010 | Mukerji et al. |
| 7,881,215 B1 | 2/2011 | Daigle et al. |
| 7,895,649 B1 | 2/2011 | Brook et al. |
| 7,948,952 B2 | 5/2011 | Hurtta et al. |
| 7,970,934 B1 | 6/2011 | Patel |
| 7,983,258 B1 | 7/2011 | Ruben et al. |
| 7,990,847 B1 | 8/2011 | Leroy et al. |
| 7,991,859 B1 | 8/2011 | Miller et al. |
| 8,019,870 B1 | 9/2011 | Eppstein et al. |
| 8,032,634 B1 | 10/2011 | Eppstein et al. |
| 8,037,532 B2 | 10/2011 | Haswell |
| 8,090,866 B1 | 1/2012 | Bashyam et al. |
| 8,122,116 B2 | 2/2012 | Matsunaga et al. |
| 8,179,809 B1 | 5/2012 | Eppstein et al. |
| 8,185,651 B2 | 5/2012 | Moran et al. |
| 8,191,106 B2 | 5/2012 | Choyi et al. |
| 8,220,056 B2 | 7/2012 | Owens, Jr. |
| 8,224,971 B1 | 7/2012 | Miller et al. |
| 8,239,670 B1 | 8/2012 | Kaufman et al. |
| 8,266,235 B2 | 9/2012 | Jalan et al. |
| 8,289,981 B1 | 10/2012 | Wei et al. |
| 8,296,434 B1 | 10/2012 | Miller et al. |
| 8,301,802 B2 | 10/2012 | Wei et al. |
| 8,312,507 B2 | 11/2012 | Chen et al. |
| 8,379,515 B1 | 2/2013 | Mukerji |
| 8,448,245 B2 | 5/2013 | Banerjee et al. |
| 8,478,708 B1 | 7/2013 | Larcom |
| 8,499,093 B2 | 7/2013 | Grosser et al. |
| 8,539,075 B2 | 9/2013 | Bali et al. |
| 8,554,929 B1 | 10/2013 | Szeto et al. |
| 8,560,693 B1 | 10/2013 | Wang et al. |
| 8,584,199 B1 | 11/2013 | Chen et al. |
| 8,595,791 B1 | 11/2013 | Chen et al. |
| 8,595,845 B2 | 11/2013 | Basavapatna et al. |
| RE44,701 E | 1/2014 | Chen et al. |
| 8,675,488 B1 | 3/2014 | Sidebottom et al. |
| 8,681,610 B1 | 3/2014 | Mukerji |
| 8,750,164 B2 | 6/2014 | Casado et al. |
| 8,782,221 B2 | 7/2014 | Han |
| 8,800,034 B2 | 8/2014 | McHugh et al. |
| 8,806,011 B1 | 8/2014 | Graham-Cumming |
| 8,813,180 B1 | 8/2014 | Chen et al. |
| 8,813,228 B2 | 8/2014 | Magee et al. |
| 8,826,372 B1 | 9/2014 | Chen et al. |
| 8,832,832 B1 | 9/2014 | Visbal |
| 8,879,427 B2 | 11/2014 | Krumel |
| 8,885,463 B1 | 11/2014 | Medved et al. |
| 8,897,154 B2 | 11/2014 | Jalan et al. |
| 8,965,957 B2 | 2/2015 | Barros |
| 8,977,749 B1 | 3/2015 | Han |
| 8,990,262 B2 | 3/2015 | Chen et al. |
| 9,094,364 B2 | 7/2015 | Jalan et al. |
| 9,106,561 B2 | 8/2015 | Jalan et al. |
| 9,154,577 B2 | 10/2015 | Jalan et al. |
| 9,154,584 B1 | 10/2015 | Han |
| 9,215,208 B2 | 12/2015 | Fraize et al. |
| 9,215,275 B2 | 12/2015 | Kannan et al. |

(56) References Cited

U.S. PATENT DOCUMENTS

| | | |
|---|---|---|
| 9,219,751 B1 | 12/2015 | Chen et al. |
| 9,253,152 B1 | 2/2016 | Chen et al. |
| 9,270,705 B1 | 2/2016 | Chen et al. |
| 9,270,774 B2 | 2/2016 | Jalan et al. |
| 9,338,225 B2 | 5/2016 | Jalan et al. |
| 9,350,744 B2 | 5/2016 | Chen et al. |
| 9,356,910 B2 | 5/2016 | Chen et al. |
| 9,621,575 B1 | 4/2017 | Jalan et al. |
| 2001/0042204 A1 | 11/2001 | Blaker et al. |
| 2001/0049741 A1 | 12/2001 | Skene et al. |
| 2002/0032777 A1 | 3/2002 | Kawata et al. |
| 2002/0078164 A1 | 6/2002 | Reinschmidt |
| 2002/0087708 A1 | 7/2002 | Low et al. |
| 2002/0091844 A1 | 7/2002 | Craft et al. |
| 2002/0103916 A1 | 8/2002 | Chen et al. |
| 2002/0133491 A1 | 9/2002 | Sim et al. |
| 2002/0138618 A1 | 9/2002 | Szabo |
| 2002/0143991 A1 | 10/2002 | Chow et al. |
| 2002/0178259 A1 | 11/2002 | Doyle et al. |
| 2002/0188839 A1 | 12/2002 | Noehring et al. |
| 2002/0191575 A1 | 12/2002 | Kalavade et al. |
| 2002/0194335 A1 | 12/2002 | Maynard |
| 2002/0194350 A1 | 12/2002 | Lu et al. |
| 2003/0009591 A1 | 1/2003 | Hayball et al. |
| 2003/0014544 A1 | 1/2003 | Pettey |
| 2003/0023711 A1 | 1/2003 | Parmar et al. |
| 2003/0023846 A1 | 1/2003 | Krishna et al. |
| 2003/0023873 A1 | 1/2003 | Ben-Itzhak |
| 2003/0028585 A1 | 2/2003 | Yeager et al. |
| 2003/0035409 A1 | 2/2003 | Wang et al. |
| 2003/0035420 A1 | 2/2003 | Niu |
| 2003/0061507 A1 | 3/2003 | Xiong et al. |
| 2003/0069973 A1 | 4/2003 | Ganesan et al. |
| 2003/0091028 A1 | 5/2003 | Chang et al. |
| 2003/0131245 A1 | 7/2003 | Linderman |
| 2003/0135625 A1 | 7/2003 | Fontes et al. |
| 2003/0187688 A1 | 10/2003 | Fey et al. |
| 2003/0195962 A1 | 10/2003 | Kikuchi et al. |
| 2003/0196081 A1 | 10/2003 | Savarda et al. |
| 2003/0200456 A1 | 10/2003 | Cyr et al. |
| 2004/0008711 A1 | 1/2004 | Lahti et al. |
| 2004/0054807 A1 | 3/2004 | Harvey et al. |
| 2004/0059943 A1 | 3/2004 | Marquet et al. |
| 2004/0059951 A1 | 3/2004 | Pinkas et al. |
| 2004/0059952 A1 | 3/2004 | Newport et al. |
| 2004/0062246 A1 | 4/2004 | Boucher et al. |
| 2004/0073703 A1 | 4/2004 | Boucher et al. |
| 2004/0078419 A1 | 4/2004 | Ferrari et al. |
| 2004/0078480 A1 | 4/2004 | Boucher et al. |
| 2004/0093524 A1 | 5/2004 | Sakai |
| 2004/0111516 A1 | 6/2004 | Cain |
| 2004/0111635 A1 | 6/2004 | Boivie et al. |
| 2004/0128312 A1 | 7/2004 | Shalabi et al. |
| 2004/0139057 A1 | 7/2004 | Hirata et al. |
| 2004/0139108 A1 | 7/2004 | Tang et al. |
| 2004/0141005 A1 | 7/2004 | Banatwala et al. |
| 2004/0143599 A1 | 7/2004 | Shalabi et al. |
| 2004/0143751 A1 | 7/2004 | Peikari |
| 2004/0187032 A1 | 9/2004 | Gels et al. |
| 2004/0199616 A1 | 10/2004 | Karhu |
| 2004/0199646 A1 | 10/2004 | Susai et al. |
| 2004/0202182 A1 | 10/2004 | Lund et al. |
| 2004/0210623 A1 | 10/2004 | Hydrie et al. |
| 2004/0210663 A1 | 10/2004 | Phillips et al. |
| 2004/0213158 A1 | 10/2004 | Collett et al. |
| 2004/0242200 A1 | 12/2004 | Maeoka et al. |
| 2004/0268358 A1 | 12/2004 | Darling et al. |
| 2005/0005207 A1 | 1/2005 | Herneque |
| 2005/0009520 A1 | 1/2005 | Herrero et al. |
| 2005/0021848 A1 | 1/2005 | Jorgenson |
| 2005/0021999 A1 | 1/2005 | Touitou et al. |
| 2005/0027862 A1 | 2/2005 | Nguyen et al. |
| 2005/0036501 A1 | 2/2005 | Chung et al. |
| 2005/0036511 A1 | 2/2005 | Baratakke et al. |
| 2005/0041584 A1 | 2/2005 | Lau et al. |
| 2005/0044068 A1 | 2/2005 | Lin et al. |
| 2005/0044270 A1 | 2/2005 | Grove et al. |
| 2005/0074013 A1 | 4/2005 | Hershey et al. |
| 2005/0080890 A1 | 4/2005 | Yang et al. |
| 2005/0102400 A1 | 5/2005 | Nakahara et al. |
| 2005/0108434 A1 | 5/2005 | Witchey |
| 2005/0125276 A1 | 6/2005 | Rusu |
| 2005/0163073 A1 | 7/2005 | Heller et al. |
| 2005/0198335 A1 | 9/2005 | Brown et al. |
| 2005/0210243 A1 | 9/2005 | Archard et al. |
| 2005/0213586 A1 | 9/2005 | Cyganski et al. |
| 2005/0240989 A1 | 10/2005 | Kim et al. |
| 2005/0249225 A1 | 11/2005 | Singhal |
| 2005/0257093 A1 | 11/2005 | Johnson et al. |
| 2005/0259586 A1 | 11/2005 | Hafid et al. |
| 2006/0023721 A1 | 2/2006 | Miyake et al. |
| 2006/0036610 A1 | 2/2006 | Wang |
| 2006/0036733 A1 | 2/2006 | Fujimoto et al. |
| 2006/0056297 A1 | 3/2006 | Bryson et al. |
| 2006/0061507 A1 | 3/2006 | Mohamadi |
| 2006/0064478 A1 | 3/2006 | Sirkin |
| 2006/0069774 A1 | 3/2006 | Chen et al. |
| 2006/0069804 A1 | 3/2006 | Miyake et al. |
| 2006/0077926 A1 | 4/2006 | Rune |
| 2006/0092950 A1 | 5/2006 | Arregoces et al. |
| 2006/0098645 A1 | 5/2006 | Walkin |
| 2006/0112170 A1 | 5/2006 | Sirkin |
| 2006/0143707 A1 | 6/2006 | Song et al. |
| 2006/0168319 A1 | 7/2006 | Trossen |
| 2006/0187901 A1 | 8/2006 | Cortes et al. |
| 2006/0190997 A1 | 8/2006 | Mahajani et al. |
| 2006/0206936 A1 | 9/2006 | Liang et al. |
| 2006/0209789 A1 | 9/2006 | Gupta et al. |
| 2006/0212522 A1 | 9/2006 | Walter et al. |
| 2006/0230129 A1 | 10/2006 | Swami et al. |
| 2006/0233100 A1 | 10/2006 | Luft et al. |
| 2006/0251057 A1 | 11/2006 | Kwon et al. |
| 2006/0253902 A1 | 11/2006 | Rabadan et al. |
| 2006/0256716 A1 | 11/2006 | Caci |
| 2006/0265585 A1 | 11/2006 | Lai |
| 2006/0277303 A1 | 12/2006 | Hegde et al. |
| 2006/0280121 A1 | 12/2006 | Matoba |
| 2006/0288411 A1 | 12/2006 | Garg et al. |
| 2007/0019543 A1 | 1/2007 | Wei et al. |
| 2007/0056038 A1 | 3/2007 | Lok |
| 2007/0073660 A1 | 3/2007 | Quinlan |
| 2007/0086382 A1 | 4/2007 | Narayanan et al. |
| 2007/0094396 A1 | 4/2007 | Takano et al. |
| 2007/0118881 A1 | 5/2007 | Mitchell et al. |
| 2007/0156919 A1 | 7/2007 | Potti et al. |
| 2007/0165622 A1 | 7/2007 | O'Rourke et al. |
| 2007/0185998 A1 | 8/2007 | Touitou et al. |
| 2007/0195792 A1 | 8/2007 | Chen et al. |
| 2007/0230337 A1 | 10/2007 | Igarashi et al. |
| 2007/0245090 A1 | 10/2007 | King et al. |
| 2007/0259673 A1 | 11/2007 | Willars et al. |
| 2007/0283429 A1 | 12/2007 | Chen et al. |
| 2007/0286077 A1 | 12/2007 | Wu |
| 2007/0288247 A1 | 12/2007 | Mackay |
| 2007/0291773 A1 | 12/2007 | Khan et al. |
| 2007/0294209 A1 | 12/2007 | Strub et al. |
| 2008/0031263 A1 | 2/2008 | Ervin et al. |
| 2008/0101396 A1 | 5/2008 | Miyata |
| 2008/0109452 A1 | 5/2008 | Patterson |
| 2008/0109870 A1 | 5/2008 | Sherlock et al. |
| 2008/0134332 A1 | 6/2008 | Keohane et al. |
| 2008/0162679 A1 | 7/2008 | Maher et al. |
| 2008/0183885 A1 | 7/2008 | Durrey et al. |
| 2008/0228781 A1 | 9/2008 | Chen et al. |
| 2008/0229418 A1 | 9/2008 | Chen et al. |
| 2008/0250099 A1 | 10/2008 | Shen et al. |
| 2008/0256623 A1 | 10/2008 | Worley et al. |
| 2008/0263209 A1 | 10/2008 | Pisharody et al. |
| 2008/0271130 A1 | 10/2008 | Ramamoorthy |
| 2008/0282254 A1 | 11/2008 | Blander et al. |
| 2008/0291911 A1 | 11/2008 | Lee et al. |
| 2009/0049198 A1 | 2/2009 | Blinn et al. |
| 2009/0070470 A1 | 3/2009 | Bauman et al. |
| 2009/0077651 A1 | 3/2009 | Poeluev |

(56) References Cited

U.S. PATENT DOCUMENTS

| | | |
|---|---|---|
| 2009/0092124 A1 | 4/2009 | Singhal et al. |
| 2009/0106830 A1 | 4/2009 | Maher |
| 2009/0138606 A1 | 5/2009 | Moran et al. |
| 2009/0138945 A1 | 5/2009 | Savchuk |
| 2009/0141634 A1 | 6/2009 | Rothstein et al. |
| 2009/0150996 A1 | 6/2009 | Haswell |
| 2009/0164614 A1 | 6/2009 | Christian et al. |
| 2009/0168995 A1 | 7/2009 | Banga et al. |
| 2009/0172093 A1 | 7/2009 | Matsubara |
| 2009/0213858 A1 | 8/2009 | Dolganow et al. |
| 2009/0222583 A1 | 9/2009 | Josefsberg et al. |
| 2009/0227228 A1 | 9/2009 | Hu et al. |
| 2009/0228547 A1 | 9/2009 | Miyaoka et al. |
| 2009/0241190 A1 | 9/2009 | Todd et al. |
| 2009/0262741 A1 | 10/2009 | Jungck et al. |
| 2009/0271472 A1 | 10/2009 | Scheifler et al. |
| 2009/0287941 A1 | 11/2009 | Shouno |
| 2009/0313379 A1 | 12/2009 | Rydnell et al. |
| 2010/0008229 A1 | 1/2010 | Bi et al. |
| 2010/0023621 A1 | 1/2010 | Ezolt et al. |
| 2010/0036952 A1 | 2/2010 | Hazlewood et al. |
| 2010/0054139 A1 | 3/2010 | Chun et al. |
| 2010/0061319 A1 | 3/2010 | Aso et al. |
| 2010/0064008 A1 | 3/2010 | Yan et al. |
| 2010/0082787 A1 | 4/2010 | Kommula et al. |
| 2010/0083076 A1 | 4/2010 | Ushiyama |
| 2010/0094985 A1 | 4/2010 | Abu-Samaha et al. |
| 2010/0098417 A1 | 4/2010 | Tse-Au |
| 2010/0106833 A1 | 4/2010 | Banerjee et al. |
| 2010/0106854 A1 | 4/2010 | Kim et al. |
| 2010/0128606 A1 | 5/2010 | Patel |
| 2010/0162378 A1 | 6/2010 | Jayawardena et al. |
| 2010/0210265 A1 | 8/2010 | Borzsei et al. |
| 2010/0217793 A1 | 8/2010 | Preiss |
| 2010/0217819 A1 | 8/2010 | Chen et al. |
| 2010/0223630 A1 | 9/2010 | Degenkolb et al. |
| 2010/0228819 A1 | 9/2010 | Wei |
| 2010/0235507 A1 | 9/2010 | Szeto et al. |
| 2010/0235522 A1 | 9/2010 | Chen et al. |
| 2010/0235880 A1 | 9/2010 | Chen et al. |
| 2010/0238828 A1 | 9/2010 | Russell |
| 2010/0265824 A1 | 10/2010 | Chao et al. |
| 2010/0268814 A1 | 10/2010 | Cross et al. |
| 2010/0284300 A1 | 11/2010 | Deshpande et al. |
| 2010/0286998 A1 | 11/2010 | Picken |
| 2010/0293296 A1 | 11/2010 | Hsu et al. |
| 2010/0312740 A1 | 12/2010 | Clemm et al. |
| 2010/0318631 A1 | 12/2010 | Shukla |
| 2010/0322252 A1 | 12/2010 | Suganthi et al. |
| 2010/0330971 A1 | 12/2010 | Selitser et al. |
| 2010/0333101 A1 | 12/2010 | Pope et al. |
| 2011/0007652 A1 | 1/2011 | Bai |
| 2011/0019550 A1 | 1/2011 | Bryers et al. |
| 2011/0023071 A1 | 1/2011 | Li et al. |
| 2011/0026537 A1 | 2/2011 | Kolhi et al. |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |
| 2011/0047294 A1 | 2/2011 | Singh et al. |
| 2011/0060831 A1 | 3/2011 | Ishii et al. |
| 2011/0082947 A1 | 4/2011 | Szeto et al. |
| 2011/0093522 A1 | 4/2011 | Chen et al. |
| 2011/0093785 A1 | 4/2011 | Lee et al. |
| 2011/0099403 A1 | 4/2011 | Miyata et al. |
| 2011/0110294 A1 | 5/2011 | Valluri et al. |
| 2011/0131646 A1 | 6/2011 | Park et al. |
| 2011/0145324 A1 | 6/2011 | Reinart et al. |
| 2011/0153744 A1 | 6/2011 | Brown |
| 2011/0153834 A1 | 6/2011 | Bharrat |
| 2011/0178985 A1 | 7/2011 | San Martin Arribas et al. |
| 2011/0185073 A1 | 7/2011 | Jagadeeswaran et al. |
| 2011/0191773 A1 | 8/2011 | Pavel et al. |
| 2011/0196971 A1 | 8/2011 | Reguraman et al. |
| 2011/0249572 A1 | 10/2011 | Singhal et al. |
| 2011/0276695 A1 | 11/2011 | Maldaner |
| 2011/0276982 A1 | 11/2011 | Nakayama et al. |
| 2011/0289496 A1 | 11/2011 | Steer |
| 2011/0292939 A1 | 12/2011 | Subramaian et al. |
| 2011/0302256 A1 | 12/2011 | Sureshehandra et al. |
| 2011/0307541 A1 | 12/2011 | Walsh et al. |
| 2012/0008495 A1 | 1/2012 | Shen et al. |
| 2012/0023231 A1 | 1/2012 | Ueno |
| 2012/0026897 A1 | 2/2012 | Guichard et al. |
| 2012/0030341 A1 | 2/2012 | Jensen et al. |
| 2012/0036272 A1 | 2/2012 | El Zur |
| 2012/0042060 A1 | 2/2012 | Jackowski et al. |
| 2012/0066371 A1 | 3/2012 | Patel et al. |
| 2012/0084419 A1 | 4/2012 | Kannan et al. |
| 2012/0084460 A1 | 4/2012 | McGinnity et al. |
| 2012/0106355 A1 | 5/2012 | Ludwig |
| 2012/0110472 A1 | 5/2012 | Amrhein et al. |
| 2012/0117571 A1 | 5/2012 | Davis et al. |
| 2012/0117646 A1 | 5/2012 | Yoon et al. |
| 2012/0144014 A1 | 6/2012 | Natham et al. |
| 2012/0144015 A1 | 6/2012 | Jalan et al. |
| 2012/0151353 A1 | 6/2012 | Joanny |
| 2012/0163186 A1 | 6/2012 | Wei et al. |
| 2012/0170548 A1 | 7/2012 | Rajagopalan et al. |
| 2012/0173759 A1 | 7/2012 | Agarwal et al. |
| 2012/0174196 A1 | 7/2012 | Bhogavilli et al. |
| 2012/0179770 A1 | 7/2012 | Jalan et al. |
| 2012/0191839 A1 | 7/2012 | Maynard |
| 2012/0226582 A1 | 9/2012 | Hammad |
| 2012/0239792 A1 | 9/2012 | Banerjee et al. |
| 2012/0240185 A1 | 9/2012 | Kapoor et al. |
| 2012/0290727 A1 | 11/2012 | Tivig |
| 2012/0297046 A1 | 11/2012 | Raja et al. |
| 2012/0307631 A1 | 12/2012 | Yang et al. |
| 2012/0311116 A1 | 12/2012 | Jalan et al. |
| 2013/0019025 A1 | 1/2013 | Chaturvedi et al. |
| 2013/0046876 A1 | 2/2013 | Narayana et al. |
| 2013/0058335 A1 | 3/2013 | Koponen et al. |
| 2013/0074177 A1 | 3/2013 | Varadhan et al. |
| 2013/0083725 A1 | 4/2013 | Mallya et al. |
| 2013/0100958 A1 | 4/2013 | Jalan et al. |
| 2013/0124713 A1* | 5/2013 | Feinberg ............ G06F 11/0769 709/224 |
| 2013/0128885 A1 | 5/2013 | Kardashov et al. |
| 2013/0136139 A1 | 5/2013 | Zheng et al. |
| 2013/0139245 A1 | 5/2013 | Thomas |
| 2013/0148500 A1 | 6/2013 | Sonoda et al. |
| 2013/0166762 A1 | 6/2013 | Jalan et al. |
| 2013/0173795 A1 | 7/2013 | McPherson |
| 2013/0176854 A1 | 7/2013 | Chisu et al. |
| 2013/0191486 A1 | 7/2013 | Someya et al. |
| 2013/0198385 A1 | 8/2013 | Han et al. |
| 2013/0212265 A1 | 8/2013 | Rubio Vidales et al. |
| 2013/0250765 A1 | 9/2013 | Ehsan et al. |
| 2013/0258846 A1 | 10/2013 | Damola |
| 2013/0282791 A1 | 10/2013 | Kruglick |
| 2014/0006508 A1 | 1/2014 | Goyet et al. |
| 2014/0012972 A1 | 1/2014 | Han |
| 2014/0025568 A1 | 1/2014 | Smith et al. |
| 2014/0089500 A1 | 3/2014 | Sankar et al. |
| 2014/0137190 A1 | 5/2014 | Carey et al. |
| 2014/0164617 A1 | 6/2014 | Jalan et al. |
| 2014/0169168 A1 | 6/2014 | Jalan et al. |
| 2014/0207845 A1 | 7/2014 | Han et al. |
| 2014/0258465 A1 | 9/2014 | Li |
| 2014/0258489 A1 | 9/2014 | Muppala et al. |
| 2014/0258536 A1 | 9/2014 | Chiong |
| 2014/0269308 A1 | 9/2014 | Oshiba |
| 2014/0269728 A1 | 9/2014 | Jalan et al. |
| 2014/0280832 A1 | 9/2014 | Oshiba |
| 2014/0283065 A1 | 9/2014 | Teddy et al. |
| 2014/0286313 A1 | 9/2014 | Fu et al. |
| 2014/0298091 A1† | 10/2014 | Carlen |
| 2014/0310396 A1 | 10/2014 | Christodorescu et al. |
| 2014/0325588 A1 | 10/2014 | Jalan et al. |
| 2014/0330982 A1 | 11/2014 | Jalan et al. |
| 2014/0334485 A1 | 11/2014 | Jain et al. |
| 2014/0359052 A1 | 12/2014 | Joachimpillai et al. |
| 2015/0033341 A1 | 1/2015 | Schmidtler et al. |
| 2015/0039671 A1 | 2/2015 | Jalan et al. |

(56) References Cited

U.S. PATENT DOCUMENTS

| | | | |
|---|---|---|---|
| 2015/0088597 A1 | 3/2015 | Doherty et al. | |
| 2015/0156223 A1 | 6/2015 | Xu et al. | |
| 2015/0215436 A1 | 7/2015 | Kancherla | |
| 2015/0237173 A1 | 8/2015 | Virkki et al. | |
| 2015/0281087 A1 | 10/2015 | Jalan et al. | |
| 2015/0281104 A1 | 10/2015 | Golshan et al. | |
| 2015/0296058 A1 | 10/2015 | Jalan et al. | |
| 2015/0312268 A1* | 10/2015 | Ray | H04L 63/1416 726/23 |
| 2015/0333988 A1* | 11/2015 | Jalan | H04L 43/04 709/224 |
| 2015/0350048 A1 | 12/2015 | Sampat et al. | |
| 2015/0350379 A1 | 12/2015 | Jalan et al. | |
| 2016/0014052 A1 | 1/2016 | Han | |
| 2016/0036778 A1 | 2/2016 | Chen et al. | |
| 2016/0042014 A1 | 2/2016 | Jalan et al. | |
| 2016/0043901 A1 | 2/2016 | Sankar et al. | |
| 2016/0044095 A1 | 2/2016 | Sankar et al. | |
| 2016/0050233 A1 | 2/2016 | Chen et al. | |
| 2016/0088074 A1 | 3/2016 | Kannan et al. | |
| 2016/0105395 A1 | 4/2016 | Chen et al. | |
| 2016/0105446 A1 | 4/2016 | Chen et al. | |
| 2016/0119382 A1 | 4/2016 | Chen et al. | |
| 2016/0156708 A1 | 6/2016 | Jalan et al. | |
| 2016/0173579 A1 | 6/2016 | Jalan et al. | |
| 2017/0085440 A1 | 3/2017 | Dosovitsky | |

FOREIGN PATENT DOCUMENTS

| | | |
|---|---|---|
| CN | 1449618 | 10/2003 |
| CN | 1473300 A | 2/2004 |
| CN | 1529460 | 9/2004 |
| CN | 1575582 | 2/2005 |
| CN | 1714545 A | 12/2005 |
| CN | 1725702 | 1/2006 |
| CN | 1910869 A | 2/2007 |
| CN | 101004740 A | 7/2007 |
| CN | 101094225 | 12/2007 |
| CN | 101163336 A | 4/2008 |
| CN | 101169785 A | 4/2008 |
| CN | 101189598 | 5/2008 |
| CN | 101193089 A | 6/2008 |
| CN | 101247349 A | 8/2008 |
| CN | 101261644 A | 9/2008 |
| CN | 101495993 A | 7/2009 |
| CN | 101878663 A | 11/2010 |
| CN | 102143075 A | 8/2011 |
| CN | 102546590 | 7/2012 |
| CN | 102571742 | 7/2012 |
| CN | 102577252 | 7/2012 |
| CN | 102918801 | 2/2013 |
| CN | 103533018 A | 1/2014 |
| CN | 103944954 | 7/2014 |
| CN | 104040990 | 9/2014 |
| CN | 104067569 | 9/2014 |
| CN | 104106241 | 10/2014 |
| CN | 104137491 | 11/2014 |
| CN | 104796396 A | 7/2015 |
| CN | 102577252 B | 3/2016 |
| CN | 102918801 B | 5/2016 |
| EP | 1209876 | 5/2002 |
| EP | 1770915 | 4/2007 |
| EP | 1885096 | 2/2008 |
| EP | 02296313 | 3/2011 |
| EP | 2577910 | 4/2013 |
| EP | 2622795 | 8/2013 |
| EP | 2647174 | 10/2013 |
| EP | 2760170 | 7/2014 |
| EP | 2772026 | 9/2014 |
| EP | 2901308 A2 | 8/2015 |
| EP | 2760170 B1 | 12/2015 |
| HK | 1182560 | 11/2013 |
| HK | 1183569 A | 12/2013 |
| HK | 1183996 A | 1/2014 |
| HK | 1189438 | 6/2014 |
| HK | 1198565 A1 | 5/2015 |
| HK | 1198848 A1 | 6/2015 |
| HK | 1199153 A1 | 6/2015 |
| HK | 1199779 A1 | 7/2015 |
| HK | 1200617 A | 8/2015 |
| IN | Journal39/2015 | 9/2015 |
| JP | H09-097233 | 4/1997 |
| JP | 1999096128 | 4/1999 |
| JP | H11-338836 | 10/1999 |
| JP | 2000276432 A | 10/2000 |
| JP | 2000307634 A | 11/2000 |
| JP | 2001051859 A | 2/2001 |
| JP | 2001298449 A | 10/2001 |
| JP | 2002091936 A | 3/2002 |
| JP | 2003141068 A | 5/2003 |
| JP | 2003186776 A | 7/2003 |
| JP | 2005141441 A | 6/2005 |
| JP | 2006332825 A | 12/2006 |
| JP | 2008040718 A | 2/2008 |
| JP | 2009500731 A | 1/2009 |
| JP | 2013528330 | 5/2011 |
| JP | 2014504484 A | 2/2014 |
| JP | 2014143686 | 8/2014 |
| JP | 2015507380 A | 3/2015 |
| JP | 5855663 B2 | 12/2015 |
| JP | 5906263 B | 3/2016 |
| JP | 5913609 B2 | 4/2016 |
| KR | 10-0830413 | 5/2008 |
| KR | 20130096624 A | 8/2013 |
| KR | 101576585 B1 | 12/2015 |
| TW | 375721 | 12/1999 |
| TW | 477140 B | 2/2002 |
| TW | 574655 B | 2/2004 |
| TW | 576066 B | 2/2004 |
| TW | I225999 B | 1/2005 |
| TW | I252976 B | 4/2006 |
| WO | WO1998042108 A1 | 9/1998 |
| WO | 01/13228 | 2/2001 |
| WO | 2001014990 | 3/2001 |
| WO | WO2001045349 | 6/2001 |
| WO | 2003103237 | 12/2003 |
| WO | WO2004084085 A1 | 9/2004 |
| WO | WO2006098033 A1 | 9/2006 |
| WO | 2008053954 | 5/2008 |
| WO | WO2008078593 A1 | 7/2008 |
| WO | 2011049770 | 4/2011 |
| WO | WO2011079381 A1 | 7/2011 |
| WO | 2011149796 | 12/2011 |
| WO | 2012050747 | 4/2012 |
| WO | 2012075237 | 6/2012 |
| WO | WO2012083264 A2 | 6/2012 |
| WO | WO2012097015 A2 | 7/2012 |
| WO | 2013070391 | 5/2013 |
| WO | 2013081952 | 6/2013 |
| WO | 2013096019 | 6/2013 |
| WO | 2013112492 | 8/2013 |
| WO | WO2014031046 A1 | 2/2014 |
| WO | 2014052099 | 4/2014 |
| WO | 2014088741 | 6/2014 |
| WO | 2014093829 | 6/2014 |
| WO | WO2014138483 | 9/2014 |
| WO | WO2014144837 | 9/2014 |
| WO | WO2014150617 A1 | 9/2014 |
| WO | WO2014151072 A1 | 9/2014 |
| WO | WO2014176461 A1 | 10/2014 |
| WO | WO2014179753 | 11/2014 |
| WO | WO2015153020 A1 | 10/2015 |

OTHER PUBLICATIONS

Yamamoto et al., "Performance Evaluation of Window Size in Proxy-based TCP for Multi-hop Wireless Networks," IPSJ SIG Technical Reports, May 15, 2008, vol. 2008, No. 44, pp. 109-114.

Abe et al., "Adaptive Split Connection Schemes in Advanced Relay Nodes," IEICE Technical Report, Feb. 22, 2010, vol. 109, No. 438, pp. 25-30.

(56) References Cited

OTHER PUBLICATIONS

Gite, Vivek, "Linux Tune Network Stack (Buffers Size) to Increase Networking Performance," accessed Apr. 13, 2016 at URL: <<http://www.cyberciti.biz/faq/linux-tcp-tuning/>>, Jul. 8, 2009, 24 pages.

"Tcp—TCP Protocol", Linux Programmer's Manual, accessed Apr. 13, 2016 at URL: <<https://www.freebsd.org/cgi/man.cgi?query=tcp&apropos=0&sektion=7&manpath=SuSE+Linux%2Fi386+11.0&format=asci>>, Nov. 25, 2007, 11 pages.

Spatscheck et al., "Optimizing TCP Forwarder Performance", IEEE/ACM Transactions on Networking, vol. 8, No. 2, Apr. 2000.

Kjaer et al. "Resource allocation and disturbance rejection in web servers using SLAs and virtualized servers", IEEE Transactions on Network and Service Management, IEEE, US, vol. 6, No. 4, Dec. 1, 2009.

Sharifian et al. "An approximation-based load-balancing algorithm with admission control for cluster web servers with dynamic workloads", The Journal of Supercomputing, Kluwer Academic Publishers, BO, vol. 53, No. 3, Jul. 3, 2009.

Cardellini et al., "Dynamic Load Balancing on Web-server Systems", IEEE Internet Computing, vol. 3, No. 3, pp. 28-39, May-Jun. 1999.

Hunt et al. NetDispatcher: A TCP Connection Router, IBM Research Report RC 20853 May 19, 1997.

"How to Create a Rule in Outlook 2003" CreateaRule-Outlook2003.doc 031405 mad, 3 pages.

"Oracle Intelligent Agent User's Guide," Oracle Corporation, Release 9.2.0, Part No. A96676-01, Mar. 2002, 36 pages.

"SOL11243: iRules containing the RULE_INIT iRule event do not re-initialize when a syntax error is corrected," F5 Networks, Inc., f5.support.com, May 24, 2010, 1 page.

Ganesan et al., "YAPPERS: a peer-to-peer lookup service over arbitrary topology," IEEE, pp. 1250-1260, Mar. 30-Apr. 3, 2003.

Annexstein et al., "Indexing Techniques for File Sharing in Scalable Peer-to-Peer Networks," IEEE, pp. 10-15, Oct. 14-16, 2002.

Ling et al., "A Content-Based Resource Location Mechanism in PeerIS," IEEE, pp. 279-288, Dec. 12-14, 2002.

Dainotti, Albert et al., "TIE: A Community-Oriented Traffic Classification Platform," May 11, 2009, Springer-Verlag, Traffic Monitoring and Analysis: Proceedings First International Workshop, TMA 2009. pp. 64-74. Retrieved from: Inspec. Accession No. 11061142.

Dainotti, Albert et al., "Early Classification of Network Traffic through Multi-Classification," Apr. 27, 2011, Springer Verlag, Traffic Monitoring and Analysis, Proceedings of the Third International Workshop, TMA 2011. pp. 122-135. Retrieved from Inspec. Accession No. 12232145.

Guo, Yuan-ni et al., "An Embedded Firewall System Design Based on Ptolemy II," Journal of System Simulation, vol. 16 No. 6, pp. 1361-1363, Jun. 2004.

Huang, Quan et al., "An Embedded Firewall Based on Network Processor," IEEE, 2nd International Conference on Embedded Software and Systems, 7 pages, Dec. 16-18, 2005.

Ihde, Michael et al., "Barbarians in the Gate: An Experimental Validation of NIC-Based Distributed Firewall Performance and Flood Tolerance," IEEE, International Conference on Dependable Systems and Networks, Jun. 25-28, 2006, 6 pages.

Susilo, W. et al., "Personal Firewall for Pocket PC 2003: Design & Implementation," IEEE 19th International Conference on Advanced Information Networking and Applications, vol. 2 pp. 661-666, Mar. 28-30, 2005.

\* cited by examiner
† cited by third party

SERVER HEALTH SCORE 305

- REACHABILITY / CONNECTIVITY SCORE
- CPU / MEMORY UTILIZATION
- LOAD PER SERVICE APPLICATION (E.G. HTTP, FTP)
    - # OF CONNECTIONS
    - RESPONSE TIME
    - PAGE LOADING TIME

FIG. 4

DISTRIBUTED SYSTEM TO DETERMINE A SERVER'S HEALTH

BACKGROUND OF THE INVENTION

Field of the Invention

The present invention relates generally to data networks, and more particularly to components of a data network to determine a health score of a server.

Description of the Related Art

The tremendous growth of networked clients such as smartphones and tablets has led to a large growth of network services. Many network services require deployment of a substantial number of servers and server load balancers to handle the service load. It is not uncommon to see thousands of servers used for a single popular application such as a mobile messaging application, a mobile photo application, an Internet radio or music streaming services, or a multi-person online game. In such service deployment situations, the load put on the servers is not necessarily even and is often a function of service policies of connected server load balancers (SLB), traffic managers, or application delivery controllers (ADC). When a server becomes busy, it is desirable for an ADC to detect the situation and select a more available server for new service requests. In addition, servers may fail or be taken off the service by a network administrator for maintenance reasons. It is important for an ADC to be aware of such situations and to select other servers to handle the traffic.

Typically, an ADC is connected to all servers and often detects the health of all servers directly. Upon knowing the servers' health after the detection, the SLB or ADC would adjust their service application processing accordingly. Such direct detection mechanism works well when there are few servers. However, when there are thousands of servers, the computing and resource effort to check the servers' health will consume a significant part of available resources of the ADC. Since a typical service network may have another ADC, it would be advantageous to share the load of detecting the servers' health. An ADC can be assigned to check the health of a portion of the servers while it relies on other ADCs to determine the health of other servers.

It should be apparent from the foregoing that there is a need to provide a distributed method to determine the health of a server.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for a distributed system to determine a server's health. A method for determining, by a network controller, a health score for a server may comprise receiving a request for a service session from a server, directing at least one servicing node to determine a health score of a server, receiving a health score of the server from each of the at least one servicing nodes, calculating an aggregated health score using the received health scores, and sending the aggregated health score to a servicing node designated to process the service session. The servicing node may use the aggregated health score to select or not select the server for a service session. The servicing node that receives the aggregated health score may be a different servicing node than one that reported a health score for the selected server.

A distributed system for determining a health score for a server is also disclosed. The system may comprise a plurality of servicing nodes, and a network controller that is configured to receive a request for a service session from a server, direct at least one servicing node to determine a health score of a server, receive a health score of the server from each of the at least one servicing nodes, calculate an aggregated health score using the received health scores, and send the aggregated health score to a servicing node designated to process the service session.

In further example embodiments of the present disclosure, the method steps are stored on a machine-readable medium comprising instructions, which when implemented by one or more processors, perform the recited steps. In further example embodiments, hardware systems, or devices, can be adapted to perform the recited steps. Other features, examples, and embodiments are described below.

BRIEF DESCRIPTION OF THE DRAWINGS

Embodiments are illustrated by way of example and not by limitation in the figures of the accompanying drawings, in which like references indicate similar elements.

FIG. 4 illustrates an exemplary embodiment of a server health score.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents.

Figure 1:
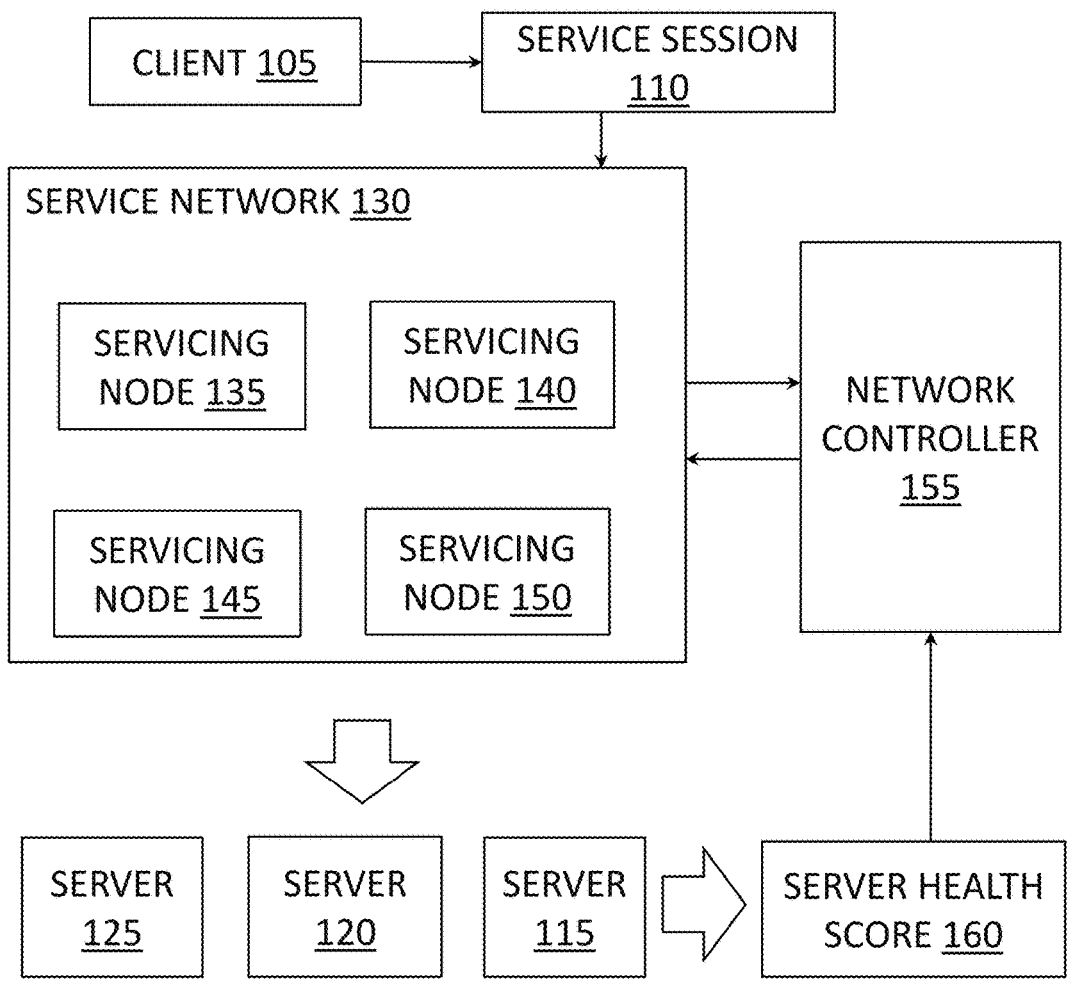
FIG. 1 illustrates an exemplary embodiment of a data network servicing a service session based on server health.

FIG. 1 illustrates an exemplary embodiment of a data network handling a service session using a service based on server health. Client 105 conducts a service session 110 with a server, such as server 115, server 120, or server 125. Although three servers are depicted in FIG. 1, there can be any number of servers. In one embodiment, data packets of service session 110 are processed by service network 130 prior to being delivered to server 115. Service network 130 comprises one or more servicing nodes, such as servicing nodes 135, 140, 145, and 150. Additionally, service network 130 connects to one or more servers 115, 120, and 125. In some embodiments, service network 130 connects to a network controller 155. In various embodiments, network controller 155 may also perform functions of a servicing node.

The one or more servicing nodes may examine the health of the servers. In an exemplary embodiment, servicing node 150 is assigned to check the health of server 115 and report a health score for server 115 to network controller 155. In some embodiments, servicing node 150 is not assigned to examine server 115 and does not report the health score of server 115 to network controller 155. Network controller 155 collects reported health scores of server 115 from the one or more servicing nodes, calculates server health score 160 for server 115, and stores server health score 160. Network controller 155 also collects reported health scores of servers 120 and 125, and calculates server health scores for those servers as well.

In various embodiments, network controller 155 sends server health score 160 to a servicing node, such as servicing node 135. Servicing node 135 determines if server 115 is healthy according to server health score 160. Servicing node 135 processes service session 110 and selects server 115 to process service session 110 if server 115 is determined to be healthy. Servicing node 135 then sends service session 110 to server 115 for processing.

Alternatively, network controller 155 may send server health score 160 for server 115 to a different servicing node, such as servicing node 150. Servicing node 150 determines server health score 160 to be poor and thus server 115 not healthy according to server health score 160. Servicing node 150 processes service session 110 and does not select server 115 based on the server health score 160. Instead, servicing node 150 selects a different server, such as server 120, to handle the service session 110.

In various embodiments, service network 130 includes additional network elements such as routers, switches, Ethernet switches, ATM switching, wireless network elements, broadband gateways, top of rack switches, access points, base stations, mobile network elements, data traffic controller, application delivery controllers, firewalls, optical switches, remote access gateways and other data network gateways, or any other network elements. Additionally, service network 130 may utilize network protocols such as IP protocol, TCP/UDP, ATM, Frame Relay, Ethernet, VLAN, WLAN, MPLS, HTTP, and other data communication protocols.

Figure 2:
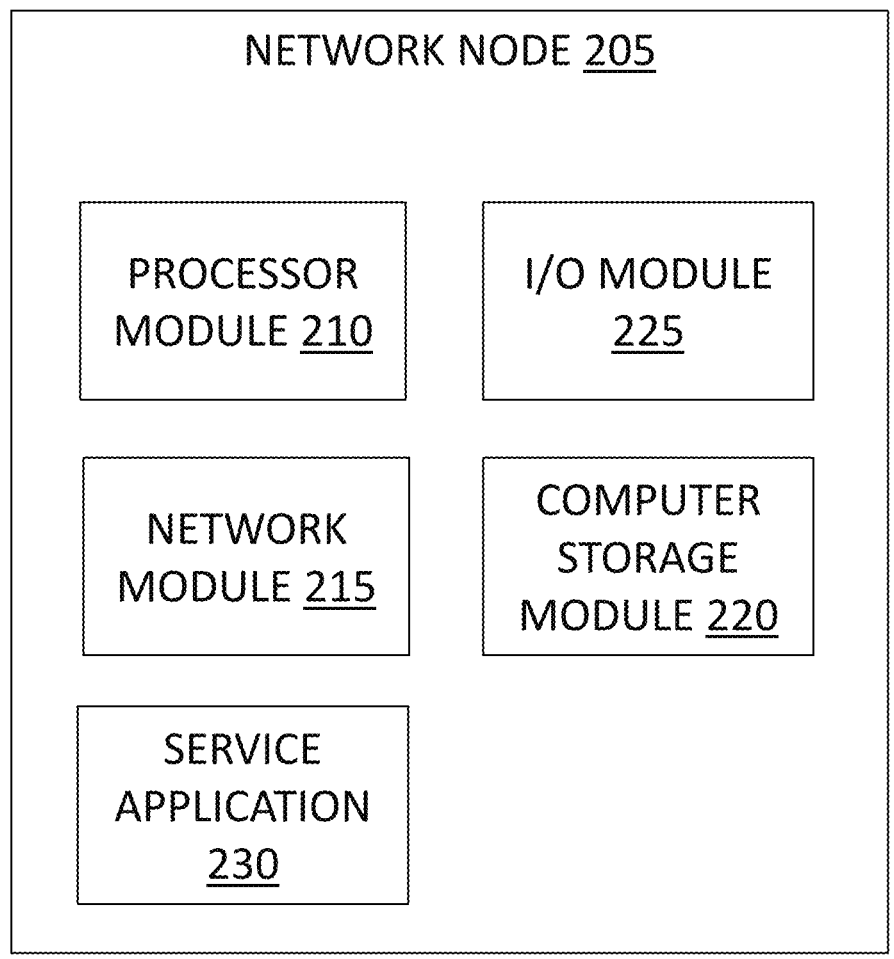
FIG. 2 illustrates an exemplary embodiment of a network node.

FIG. 2 illustrates an exemplary embodiment of a network node 205 in a service network. In various embodiments, network node 205 is a client device, a server device, a servicing node, or a network controller. Network node 205 may include a processor module 210, a network module 215, and a computer storage module 220. Processor module 210 can include one or more processors, including a microprocessor, an Intel processor, an AMD processor, a MIPS processor, an ARM-based processor, a RISC processor, or any other type of processor. Processor module 210 can also include one or more processor cores embedded in a processor. Additionally, processor module 210 can include one or more embedded processors, or embedded processing elements in a Field Programmable Gate Array (FPGA), an Application Specific Integrated Circuit (ASIC), or Digital Signal Processor (DSP).

In exemplary embodiments, network module 215 comprises a network interface such as Ethernet, optical network interface, a wireless network interface, T1/T3 interface, or a WAN or LAN interface. Furthermore, network module 215 can include a network processor. Computer storage module 220 comprises RAM, DRAM, SRAM, SDRAM, or any other memory utilized by processor module 210 or network module 215. Computer storage module 220 stores data utilized by processor module 210. Computer storage module 220 can include a hard disk drive, a solid state drive, an external disk, a DVD, a CD, a readable external disk, or any other type of storage. Additionally, computer storage module 220 stores one or more computer programming instructions, which when executed by processor module 210 or network module 215, implements one or more of the functionalities of the present invention. Network node 205 can also include an input/output (I/O) module 225, such as a keyboard, a keypad, a mouse, a gesture-based input sensor, a microphone, a physical or sensory input peripheral, a display, a speaker, a physical or sensory output peripheral, or any other input or output module.

Network node 205 may also include service application 230. When network node 205 is a client, it performs a client-side function of service application 230. A client-side function of service application 230 comprises file downloading, file uploading, web browsing, video streaming, e-book reading, game playing, gaming, photo applications, messaging, voice calling, music listening, conferencing, document editing, map navigation, online shopping, and other client-networking activities. On the other hand, service application 230 may include server-side functionalities when network node 205 functions as a server. Server-side functions of service application 230 comprise file transfer, HTTP server functions, voice call services, video and audio streaming, online games, collaboration, enterprise work flow, enterprise application, enterprise resource planning (ERP), customer relationship management (CRM), conferencing, e-commerce, transaction processing, business to business (B2B) applications, machine to machine (M2M) application, telemetry, remote access, identity authentication, and other server application functionalities.

In various embodiments, service application 230, when executed in network node 205 as a servicing node, comprise functions such as a network proxy application, security gateway, firewall, protocol gateway application, server load balancing, content caching, network optimization, data de-duplication, network cached storage access, browser optimization, and other network-based service applications. Service application 230 of a servicing node may also include functionalities implementing a part of the present invention.

Service application 230, when executed in network node 205 as a network controller, comprises network management functionalities over service network 130 such as provisioning, network node configuration, event logging, network center operation, network statistics collection and/or analysis, alert handling, and/or other network operation and management applications.

Figure 3:
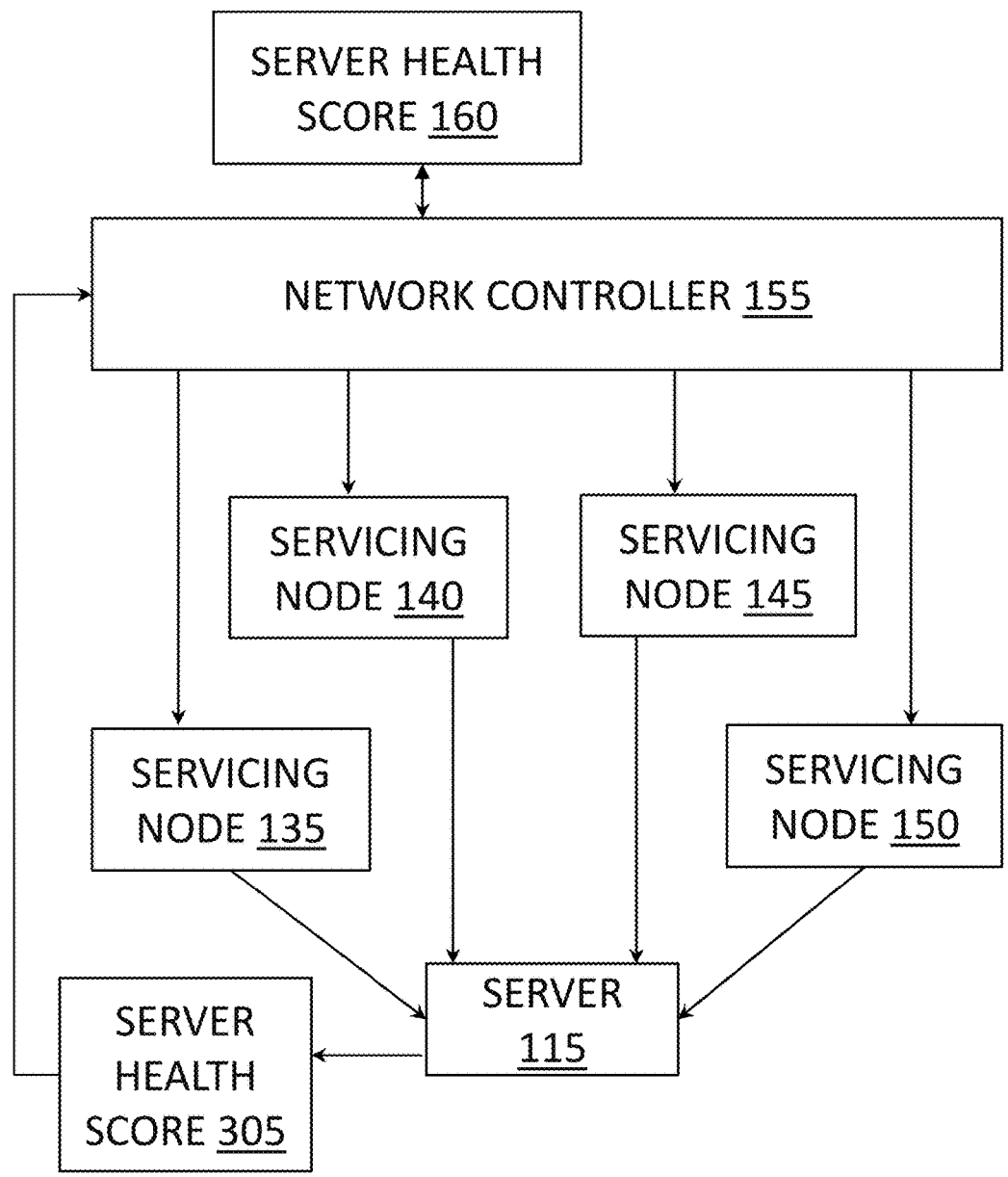
FIG. 3 illustrates an exemplary embodiment of a network controller collecting a server's health scores.

FIG. 3 further illustrates an exemplary embodiment of network controller 155 working in conjunction with one or more servicing nodes to determine a server health score. The one or more servicing nodes may include servicing nodes 135, 140, 145, and 150 and are connected to one or more servers, such as server 115.

In some embodiments, network controller 155 informs servicing nodes 135, 140, and 145 to report the health score of server 115. In other embodiments, network controller 155 informs servicing node 150 to not report the health score of server 115, or servicing node 150 does not receive any instruction from network controller 155 to report the health score of server 115, and therefore servicing node 150 does not report the health score of server 115. In various embodiments, servicing node 135, similarly for servicing node 140 or 145, checks the health of server 115 by querying server 115 and then generates server health score 305 for server 115.

Server health score 305, as illustrated in an exemplary embodiment in FIG. 4, comprises a score for connectivity or reachability, resource utilization such as CPU and memory usage, load of a service application, or various measures for the load of the service application. The various measures for the load of the service application comprise the number of active sessions or connections, pending sessions, or completed sessions; performance of the service application such as page loading time; or average, maximum, or minimum response time. Server health score 305 may also include one or more internal measurements within a servicing node, related to the server. Such internal measurements comprise data traffic sent from the servicing node to the server, data traffic from a client device using the servicing node directed to the server, or data traffic processed by the servicing node for a service application of the server.

In various embodiments, a servicing node uses different means to determine the measures indicated in server health score 305. For example, servicing node 135 may connect to server 115 using a network link. Servicing node 135 checks or measures the health of the network link to determine connectivity indicated in server health score 305. Servicing node 135 may also connect to server 115 over service network 130. Servicing node 135 checks reachability to server 115 by sending a query using a protocol, such as ping packet, echo or a proprietary protocol, to server 115 and examining if server 115 responds to the query. Servicing node 135 measures and records the reachability status into server health score 305.

In some embodiments, servicing node 135 sends a request to server 115 to obtain resource utilization information. Servicing node 135 sends a piece of software or computer programming instructions to server 115 which executes the sent software to collect and report system resource utilization to servicing node 135. In various embodiments, to obtain a load of the service application, servicing node 135 sends a service request, such as a HTTP request, for the service application and calculates the service response from server 115 with a pre-stored response. Servicing node 135 compares the performance of the service request with a pre-stored expectation of the performance. Server 115 sends to servicing node 135 a measure about the working load of the service application in a response to a client service request, separately, or in a HTTP response to servicing node 135.

In some embodiments, a servicing node 135 sends all the information in server health score 305 to network controller 155. Servicing node 135 calculates a summary server health score 305, such as "Good", "Bad", "Poor", "Failed", "1," or "0," and sends server health score 305 to network controller 155.

Figure 5:
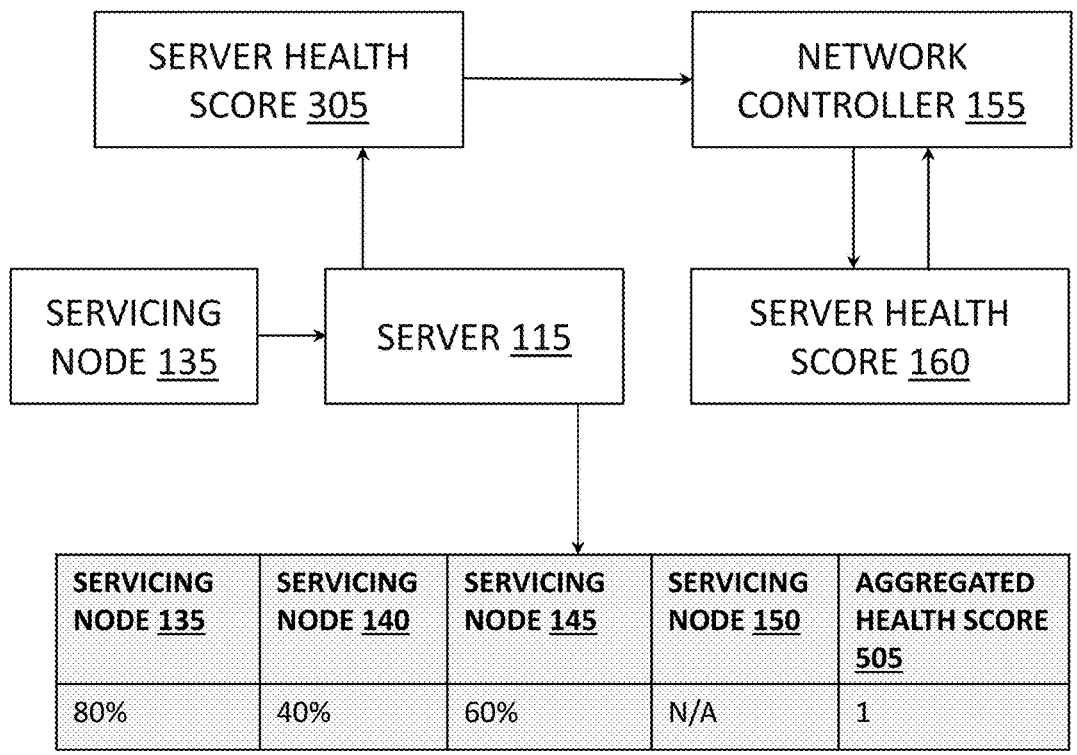
FIG. 5 illustrates an exemplary embodiment of a network controller calculating an aggregated health score for a server.

In an exemplary embodiment illustrated in FIG. 5, network controller 155 maintains server health score 160 which indicates health of server 115. Server health score 160 stores a list of health scores reported by one or more servicing nodes such as servicing nodes 135, 140, 145, or 150.

In an exemplary embodiment, network controller 155 receives server health score 305 reported from servicing node 135 about health of server 115. Network controller 155 stores server health score 305 into the corresponding entry in server health score 160. Entry for servicing node 150 is not applicable when network controller 155 determines servicing node 150 does not need to report health score for server 115.

Network controller 155 determines if there is sufficient information in server health score 160, and network controller 155 calculates aggregated health score 505 for server health score 160. In various embodiments, network controller 155 determines there is sufficient information in server health score 160 when it receives a server health score 305 from at least one servicing node, from a majority of servicing nodes, from at least one servicing node within a specified time frame (e.g. last 30 seconds, last 5 seconds), from at least two servicing nodes within a specified time frame, from all servicing nodes, or any similar variation. Aggregated health score 505 may indicate combined health information about server 115. Network controller 155 sends aggregated health score 505 for server 115 to servicing nodes 135, 140, 145, or 150.

Network controller 155 may calculate aggregated health score 505 by computing an average, weighted average, mean, median, or other arithmetic operation of the received server health scores from the at least one servicing node. As such, the aggregate health score 505 may be different from the server health score 160. In some embodiments, aggregate health score 505 calculated by the network controller 155 is also included in server health score 160. In various embodiments, network controller 155 determines aggregated health score 505 to be good, "1", or "yes" when a majority of received server health scores indicate good health for server 115. On the other hand, network controller 155 determines aggregated health score 505 to be poor, "0", or "no" when a majority of received server health scores indicate poor health for server 115. Network controller 155 considers different weighing factors to different reported server health scores depending on the reporting servicing node. In some embodiments, the calculation is based on unanimous agreement of reported server health scores. In other embodiments, network controller 155 discards a reported health score prior to the calculation, or when a reported health score is not trusted.

In an exemplary embodiment, network controller 155 receives server health score 305, replaces an earlier reported health score from servicing node 135, and calculates an updated aggregated health score 505. Network controller 155 calculates an updated aggregated health score 505 when network controller 155 receives a sufficient number of newly received server health scores. Network controller 155 may include a timer (not shown) and discards all current reported health scores. After receiving another collection of reported server health scores from the one or more servicing nodes, network controller 155 may calculate an updated aggregated health score 505.

In some embodiments, network controller 155 stores a history of reported server health scores. Network controller 155 determines from a history of reported server health scores from servicing node 135 whether the reported server health scores are not consistent and whether servicing node 135 is not trusted for further reporting server health score for a particular server, such as server 115. Then, network controller 155 instructs servicing node 135 not to further report server health score, and network controller 155 discards reported health scores from servicing node 135 in calculating aggregated health score 505. Additionally, network controller 155 instructs a different servicing node, such as servicing node 150, to report server health for server 115, so as to replace the role of servicing node 135.

In some embodiments, network controller 155 determines servicing node 135 is no longer needed to report server health for server 115, and network controller 155 instructs servicing node 135 not to report server health for server 115.

Servicing node 135 may inform network controller 155 that it no longer will report server health for server 115. Upon determining that servicing node 135 is no longer needed to report server health for server 115, network controller 155 removes an entry in server health score 160 corresponding to servicing node 135.

Figure 6:
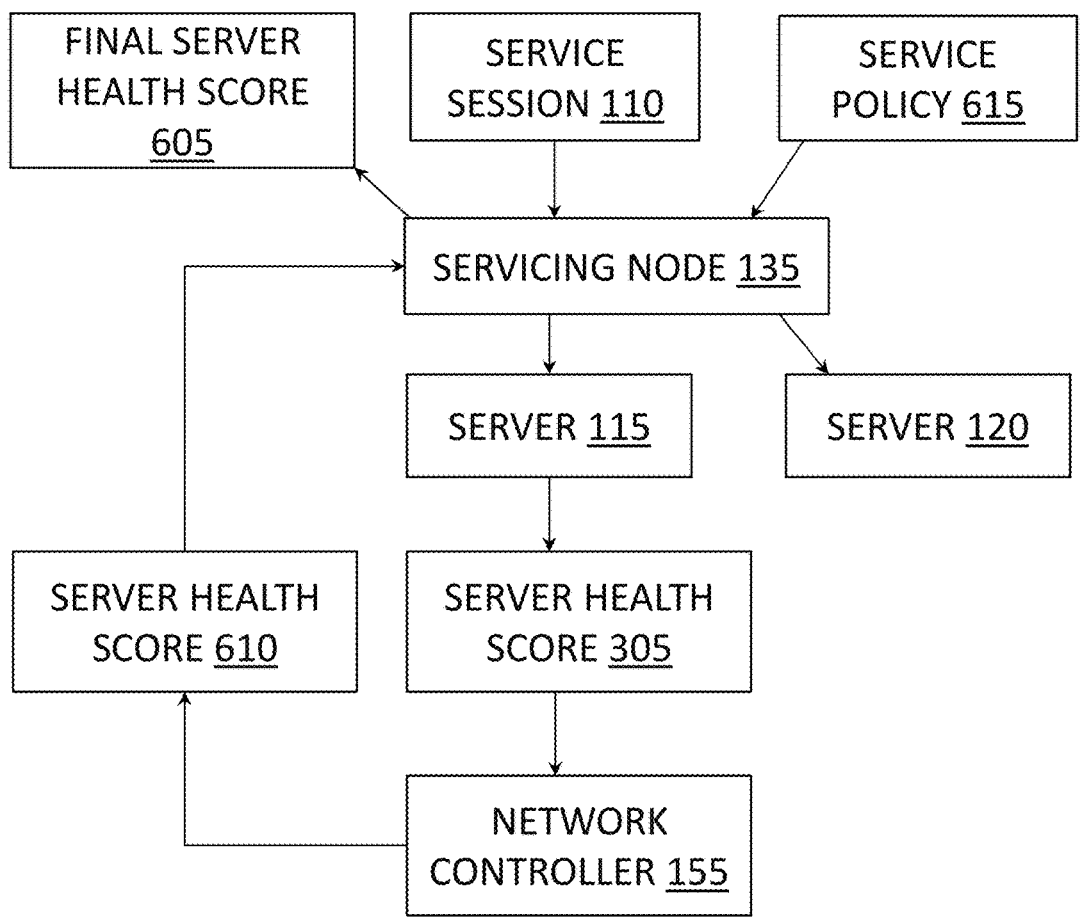
FIG. 6 illustrates an exemplary embodiment of a servicing node using a health score to process a service session.

In an exemplary embodiment illustrated in FIG. 6, servicing node 135 determines a final server health score 605 for server 115. Servicing node 135 determines server health score 305 for server 115, reports server health score 305 to network controller 155, or receives server health score 610 from network controller 155. In various embodiments, server health score 610 is the same as server health score 160, or aggregate health score 505. Servicing node 135 combines received server health score 610 and server health score 305 to get final server health score 605.

In some embodiments, servicing node 135 may receive server health score 610 from network controller 155, and detect server health score 305 directly from the server. The servicing node makes its own determination as to which server health score to use as final server health score 605. In an exemplary embodiment, network controller 155 receives a "good" server health score from servicing nodes 135 and 140, and a "bad" server health score from servicing node 145. Network controller 155 determines aggregate health score 505 to be "good", since the majority of the received server health score are good. Servicing node 145 receives aggregate health score 505 of "good", which conflicts with its own detected value of "bad", and then makes its own determination of which value to use as final server health score 605. Conflicting server health scores for server 115 may be due to the servicing nodes checking the health of server 115 at different times, using different means. Network controller 155 also calculates and updates aggregated health score 505 using scores received at different times from different servicing nodes.

In some embodiments, servicing node 135 does not use server health score 610 received from network controller 155 and considers only server health score 305 to determine final server health score 605. In other embodiments, server health score 610 is more accurate, and servicing node 135 considers only server health score 610. If server health score 610 is much worse than server health score 305, conflicts with server health score 305, or indicates that server 115 is not available or failed, servicing node 135 may use only server health score 610. In various embodiments, servicing node 135 is not assigned to report health score for server 115, and servicing node 135 uses only server health score 610 to determine final server health score 605.

In some embodiments, servicing node 135 processes service session 110 using final server health score 605 and a service policy 615. According to service policy 615, servicing node 135 selects server 115 to process service session 110. Servicing node 135 checks final server health score 605 of server 115. If final server health score 605 indicates server 115 is available, servicing node 135 selects server 115 to process service session 110. If final server health score 605 indicates server 115 is not available, busy, congested, or failed, servicing node 135 does not select server 115. In various embodiments, health server score 305 may indicate that server 115 is available such that servicing node 135 would have selected server 115, while final server health score 605 indicates server 115 is not available. In those embodiments, servicing node 135 does not select server 115 to process service session 110. In other embodiments, servicing node 135 does not detect a health score for server 115 such that servicing node 135 would have selected server 115 while final server health score 605 indicates server 115 is not available. In those embodiments, servicing node 135 does not select server 115 to process service session 110.

Servicing node 135 examines service policy 615 and select another server such as server 120 to process service session 110. In some embodiments, servicing node 135 removes server 115 from service policy 615 based on final server health score 605 so that servicing node 135 would not consider server 115 when processing service session 110. Alternatively, servicing node 135 may add server 115 to service policy 615 based on final server health score 605 so that servicing node 135 would consider server 115 when processing service session 110.

In various embodiments, servicing node 135 receives an updated server health score 610 from network controller 155 and calculates an updated final server health score 605. In other embodiments, servicing node 135 determines server health score 305 and calculate an updated final server health score 605. Servicing node 135 updates service policy 615 based on an updated final server health score 605.

In some embodiments, network controller 155 assigns different servicing nodes to collect server health scores for different servers. Network controller 155 determines that server 115 is more important than server 120 and assigns more servicing nodes for server 115 than for server 120. If network controller 155 observes that aggregated health scores of server 115 are inconsistent over a period of time, network controller 155 may assign additional servicing nodes to collect health scores of server 115, so as to better determine the aggregated health of server 115. However, if network controller 155 observes that aggregated health scores of server 115 are stable over a period of time, network controller 155 may reduce a number of servicing nodes to monitor server 115, so as to reduce the processing load of the servicing nodes, the server, and the network. In various embodiments, network controller 155 increases the frequency of health data collection by the servicing node. Alternatively, network controller 155 may decrease the frequency of health data collection, depending on the trend of aggregated health of server 115 over a period of time.

In some embodiments, network controller 155 connects to a display and displays the aggregated health score of server 115 and the trend of aggregated health of server 115. Network controller 155 generates a report of the history of aggregated health scores of one or more servers. Network controller 155 applies one or more rules to analyze the history of aggregated health scores to determine a trend of server loads, a trend of service application load, or a trend of client traffic.

What is claimed is:

1. A method for determining, at a network controller, a health score of a server, the method comprising:
    receiving, from a client, a request for a service session with a server of a plurality of servers, each of the plurality of servers being in communication with one or more servicing nodes of a plurality of servicing nodes;
    directing the plurality of servicing nodes in communication with the network controller to determine a health score of at least one of the plurality of servers, each of the plurality of servicing nodes being configured to determine the health score of the one or more of the plurality of servers, the determining of the health score by each of the plurality of servicing nodes including determining a server health score of the one or more of the plurality of servers based at least on reachability of the one or more of the plurality of servers, the reachability being determined by sending a query to the one or more of the plurality of servers and examining whether the one or more of the plurality of servers respond to the query;

receiving the health score of the at least one server from each of the plurality of servicing nodes;

calculating an aggregated health score for each server of the plurality of servers using the received health scores from the plurality of servicing nodes; and sending the aggregated health score to a servicing node of the plurality of servicing nodes, the servicing node being designated to process the service session by selecting, based at least on the aggregated health score, one of the plurality of servers for providing the service associated with the service session and directing the request for the service session to the selected one of the plurality of servers, wherein the servicing node designated to process the service session is not one of the plurality of servicing nodes that reported the health score of the one of the plurality of servers to the network controller.

2. The method of claim 1, wherein the sending the aggregated health score to the servicing node designated to process the service session enables the servicing node to use the aggregated health score to select the server or not to select the server for the service session.

3. The method of claim 2, wherein the servicing node designated to process the service session is one of the plurality of servicing nodes directed to determine a health score of at least one of the plurality of servers, and the aggregated health score conflicts with the health score determined by the servicing node.

4. The method of claim 3, wherein the servicing node designated to process the service session does not select the server based on the aggregated health score when the servicing node designated to process the service session would have selected the server if using the health score determined by the servicing node.

5. The method of claim 1, wherein, based on the aggregated health score, the servicing node designated to process the service session does not select the server, when the servicing node would have selected the server without using the aggregated health score.

6. The method of claim 1, wherein the aggregated health score is based on a majority of health scores received by the network controller.

7. The method of claim 6, wherein the majority of received health scores indicate that the server is in good health, or the majority of received health scores indicate that the server is in poor health.

8. The method of claim 1, wherein the calculating is based on an average of the received health scores, or a weighted average of the received health scores.

9. The method of claim 1, further comprising:
receiving one or more updated health scores from at least one of the plurality of servicing nodes;
calculating an updated aggregated health score based on the one or more updated health scores; and
sending the updated aggregated health score to the servicing node designated to process the service session.

10. The method of claim 1, wherein at least one of the received health scores comprises one or more scores related to connectivity, system resource utilization, number of connections, and load of a service application.

11. A non-transitory computer-readable storage medium comprising instructions, which when executed by one or more processors of a network controller, perform a method for determining a health score of a server, the method comprising:

receiving, from a client, a request for a service session with a server of a plurality of servers, each of the plurality of servers being in communication with one or more servicing nodes of a plurality of servicing nodes;

directing the plurality of servicing nodes in communication with the network controller to determine a health score of at least one of the plurality of servers, each of the plurality of servicing nodes being configured to determine the health score of the one or more of the plurality of servers, the determining of the health score by each of the plurality of servicing nodes including determining a server health score of the one or more of the plurality of servers based at least on reachability of the one or more of the plurality of servers, the reachability being determined by sending a query to the one or more of the plurality of servers and examining whether the one or more of the plurality of servers respond to the query;

receiving the health score of the at least one server from each of the plurality of servicing nodes;

calculating an aggregated health score for each server of the plurality of servers using the received health scores from the plurality of servicing nodes; and sending the aggregated health score to a servicing node of the plurality of servicing nodes, the servicing node being designated to process the service session by selecting, based at least on the aggregated health score, one of the plurality of servers for providing the service associated with the service session and directing the request for the service session to the selected one of the plurality of servers, wherein the servicing node designated to process the service session is not one of the plurality of servicing nodes that reported the health score of the one of the plurality of servers to the network controller.

12. A system for determining a health score of a server, the system comprising:
a plurality of servicing nodes in communication with a plurality of servers that provide a service; and
a network controller comprising a processor and a memory, the network controller in communication with the plurality of servicing nodes, the network controller configured to:
receive, from a client a request for a service session from a client with a server of a plurality of servers, each of the plurality of servers being in communication with one or more servicing nodes of the plurality of servicing nodes:
direct at least one the plurality of servicing nodes to determine a health score of at least one of the plurality of servers, each of the plurality of servicing nodes being configured to determine the health score of the one or more of the plurality of servers, the determining of the health score by each of the plurality of servicing nodes including determining a server health score of the one
or more of the plurality of servers based at least on reachability of the one or more of the plurality of servers, the reachability being determined by sending a query to the one or more of the plurality of servers and examining whether the one or more of the plurality of servers respond to the query;
receive the health score of the at least one server from each of the at least one plurality of servicing nodes;

calculate an aggregated health score for each server of the plurality of servers using the received health scores; and send the aggregated health score to a servicing node of the plurality of servicing nodes, the servicing node being designated the process the service session by selecting, based at least on the aggregated health score, one of the plurality of servers for providing the service associated with the service session and directing the request for the service session to the selected one of the plurality of servers, wherein the servicing node designated to process the service session is not one of the plurality of servicing nodes that reported the health score of the one of the plurality of servers to the network controller.

13. The system of claim 12, wherein the network controller configured to send the aggregated health score to the servicing node designated to process the service session enables the servicing node to use the aggregated health score to select the server or not select the server for the service session.

14. The system of claim 12, wherein the servicing node designated to process the service session is one of the at least one servicing nodes, and the aggregated health score conflicts with the health score determined by the servicing node.

15. The system of claim 12, wherein the aggregated health score is based on a majority of health scores received by the network controller.

16. The system of claim 12, wherein the aggregated health score is based on an average of the received health scores, or a weighted average of the received health scores.

17. The system of claim 12, wherein the network controller is further configured to:
  receive one or more updated health scores from the at least one servicing nodes;
  calculate an updated aggregated health score based on the one or more updated health scores; and
  send the updated aggregated health score to the servicing node designated to process the service session.

18. The system of claim 12, wherein at least one of the received health scores comprises one or more scores related to connectivity, system resource utilization, number of connections, and load of a service application.

* * * * *